United States Patent
Rudel et al.

(10) Patent No.: US 8,324,892 B2
(45) Date of Patent: Dec. 4, 2012

(54) ABSOLUTE ENCODER AND METHOD FOR GENERATING AN ABSOLUTE VALUE FOR A ANGLE OF ROTATION

(75) Inventors: Christian Rudel, Königsfeld (DE); Jörg Hornberger, Dornstetten-Aach (DE); Michael Schäuble, Villingen (DE); Michael Kisch, St. Georgen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 480 days.

(21) Appl. No.: 11/913,178

(22) PCT Filed: Jul. 19, 2006

(86) PCT No.: PCT/EP2006/007083
§ 371 (c)(1),
(2), (4) Date: Oct. 30, 2007

(87) PCT Pub. No.: WO2007/012419
PCT Pub. Date: Feb. 1, 2007

(65) Prior Publication Data
US 2008/0272723 A1 Nov. 6, 2008

(30) Foreign Application Priority Data
Jul. 26, 2005 (DE) .......................... 10 2005 036 131

(51) Int. Cl.
*G01B 7/30* (2006.01)
(52) U.S. Cl. ............ 324/207.25; 324/207.2; 324/207.12
(58) Field of Classification Search ............... 324/207.2, 324/207.21, 207.25; 318/400.27, 400.38, 318/400.39; 310/68 R, 68 B
See application file for complete search history.

(56) References Cited

U.S. PATENT DOCUMENTS

| 4,405,885 A | * | 9/1983 | Okamoto | 318/400.37 |
| 4,952,830 A | * | 8/1990 | Shirakawa | 310/68 B |

(Continued)

FOREIGN PATENT DOCUMENTS

DE    41 41 000    7/1992

(Continued)

OTHER PUBLICATIONS

Rotary Encoder from Wikipedia, the free encyclopedia; pp. 1-6, retrieved Aug. 21, 2007.

(Continued)

*Primary Examiner* — Jay Patidar
(74) *Attorney, Agent, or Firm* — Milton Oliver, Esq.; Oliver Intellectual Property LLC

(57) ABSTRACT

An electric motor (10) has: a stator (12) and a rotor (14) having a shaft (87). The rotor (14) has a sensor magnet (82) having a number SP of sensor poles (71, 72, 73, 74) for generating a predetermined distribution of the magnetic flux density, such that SP=2, 4, 6, 8, etc. The motor also has at least two rotor position sensors (450, 455, 460, 465) for generating rotor position signals (B_S1, B_S2) characterizing the magnetic flux density, the rotor position sensors (450, 455, 460, 465) being arranged in the region (30) of the circumference of the sensor magnet (82). The motor also has an evaluation apparatus (32) that ascertains, from the rotor position signals (B_S1, B_S2), an absolute value (phi_el, phi_mech) for the rotational position of the rotor (14). A method of generating an absolute value for the rotational position of an electric motor is likewise described.

21 Claims, 14 Drawing Sheets

U.S. PATENT DOCUMENTS

| | | | |
|---|---|---|---|
| 5,162,798 A | 11/1992 | Yundt | 341/116 |
| 5,532,533 A | 7/1996 | Mizutani | 310/68 |
| 5,880,683 A | 3/1999 | Brandestini | 341/10 |
| 6,013,966 A | 1/2000 | Fehrenbacher et al. | 310/257 |
| 6,184,639 B1 | 2/2001 | Wallner | 318/439 |
| 6,201,389 B1 * | 3/2001 | Apel et al. | 324/207.2 |
| 6,222,290 B1 | 4/2001 | Schob et al. | 310/68 |
| 6,433,536 B1 | 8/2002 | Yundt et al. | 324/207.22 |
| 7,009,387 B2 | 3/2006 | Guderzo | 324/207.2 |
| 7,292,028 B2 | 11/2007 | Hahn | 324/207.25 |
| 7,340,362 B2 | 3/2008 | Kitamura et al. | 702/95 |
| 2003/0146727 A1 | 8/2003 | Ishii | 318/652 |
| 2006/0056821 A1 | 3/2006 | Hornberger et al. | 388/809 |
| 2007/0033818 A1 | 2/2007 | Kitamura et al. | 33/355 R |

FOREIGN PATENT DOCUMENTS

| | | | |
|---|---|---|---|
| DE | 196 17 134 | | 10/1997 |
| DE | 100 18 728 | | 10/2001 |
| DE | 10 2005-02830 | | 8/2005 |
| EP | 1 016 852 | | 7/2000 |
| EP | 1279 929 | | 1/2003 |
| JP | 401186159 A | * | 7/1989 ... 310/261 |
| JP | 1-173614 U | | 12/1989 |
| JP | 2000-078809 A | | 3/2000 |
| JP | 2000-092805 A | | 3/2000 |
| JP | 2003-065796 A | | 3/2003 |
| JP | 2003-240598 A | | 8/2003 |
| WO | WO 04-001341 | | 12/2003 |
| WO | WO 2005-003683 A | | 1/2005 |

OTHER PUBLICATIONS

Overview Rotary Encoders Edition 2007; Pepperl & Fuchs, 6 pp. 2007; Twinsburg Ohio, 44087 USA.

MHGA 400 Magnetic Absolute Encoder; 4 pp. Hubner Elektromaschinen, Berlin, Germany D-10924.

Neodymium Anisotrooic Sintered Ring Magnet. ,Copyright© 1997, 3 pp., Hitachi Metals, Ltd.

Magnetisierungsarten [Magnetization Patterns]; Christian Rudel, Jul. 21, 2005 (pp. 1-4).

Daniel Boris. How Do I Write An Emulator? Dec. 2006 at WWW. ATARIHQ.COM/DANB: 14 pp.

Pat. Abs. of Japan, English abstract of JP-2000-078809-A, 1 page.

Pat. Abs. of Japan, English abstract of JP-2000-092805-A, 1 page.

Pat. Abs. of Japan, English abstract of JP-2003-065796-A, 1 page.

Pat. Abs. of Japan, English abstract of JP-2003-240598-A, 1 page.

PATERRA200 machine translation of JP 2003-240 598-A, Yamashita+Sato.

* cited by examiner a.)

b.)

a.)

b.)

ABSOLUTE ENCODER AND METHOD FOR GENERATING AN ABSOLUTE VALUE FOR A ANGLE OF ROTATION

CROSS-REFERENCE

This application is a section 371 of PCT/EP2006/07083, filed 19 Jul. 2006, published 1 Feb. 2007 as WO 2007-12419-A2.

FIELD OF THE INVENTION

The invention relates to an absolute rotation angle sensor, in particular an absolute rotation angle sensor for an electric motor, and it relates to a method of generating absolute rotation angle values during the operation of such a motor.

BACKGROUND

Absolute rotation angle sensors, which are also referred to as encoders, are generally very expensive.

It is an object of the invention to make available an electric motor having a novel absolute rotation angle sensor, as well as a method of generating an absolute rotation angle value.

SUMMARY OF THE INVENTION

This object is achieved by an absolute rotation angle sensor which is arranged on the stator and configured to sense a vector component, in a predetermined direction, of the locally effective magnetic flux. The disposition of two analog sensors with which, at the relevant sensor, a locally effective vector component of the magnetic flux of the sensor magnet is sensed, said component extending in a predetermined direction relative to the relevant sensor, makes it possible to generate from the rotor position signals of these two sensors, which are arranged at a predetermined rotation angle distance from one another in the region of the rotation-angle-dependent magnetic flux at the stator, an absolute value for the instantaneous rotation angle of the sensor magnet.

Another manner of achieving the stated object is provided by a method in which two angularly separated analog magnetic sensors each measure a vector component of magnetic flux and generate a respective output signal, the output signals are applied to an evaluation apparatus, and the evaluation apparatus generates an absolute value signal corresponding to a rotation angle of the rotor. Such a method for generating an absolute rotation angle value is applicable to a plurality of motor types and enables, for example in the case of a three-phase motor, the generation of a largely constant torque without requiring, for that purpose, expensive sensors for the absolute value of the rotation angle.

In the interest of brevity, reference is made to the content of the following citations:
a) WO 2004/001 341 A1, PFAFF & RUDEL, published 31 Dec. 2003;
b) DE 10 2005 002 830 A1, PFAFF & RUDEL, published 25 Aug. 2005.

Both documents show signal processing in a context of sinusoidal signals, in particular standardization to an identical amplitude and identical DC offset. This is possible in the same fashion using both analog circuits and digital methods.

BRIEF FIGURE DESCRIPTION

Further details and advantageous refinements of the invention are evident from the exemplifying embodiments, in no way to be understood as a limitation of the invention, that are described below and depicted in the drawings.

Figure 12:
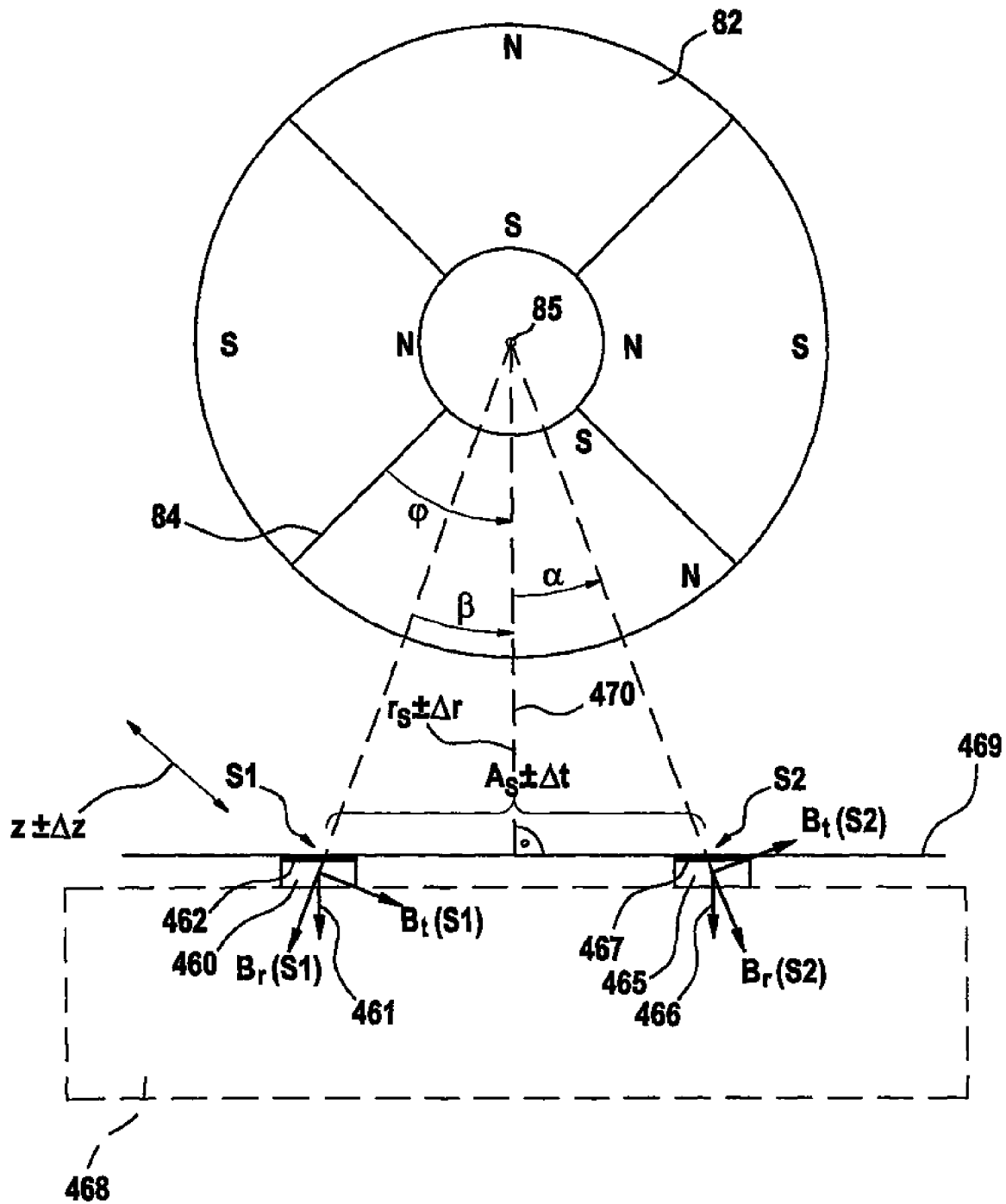
FIG. 12 shows a sensor arrangement having two rotor position sensors arranged symmetrically in a common plane.
Figure 13:
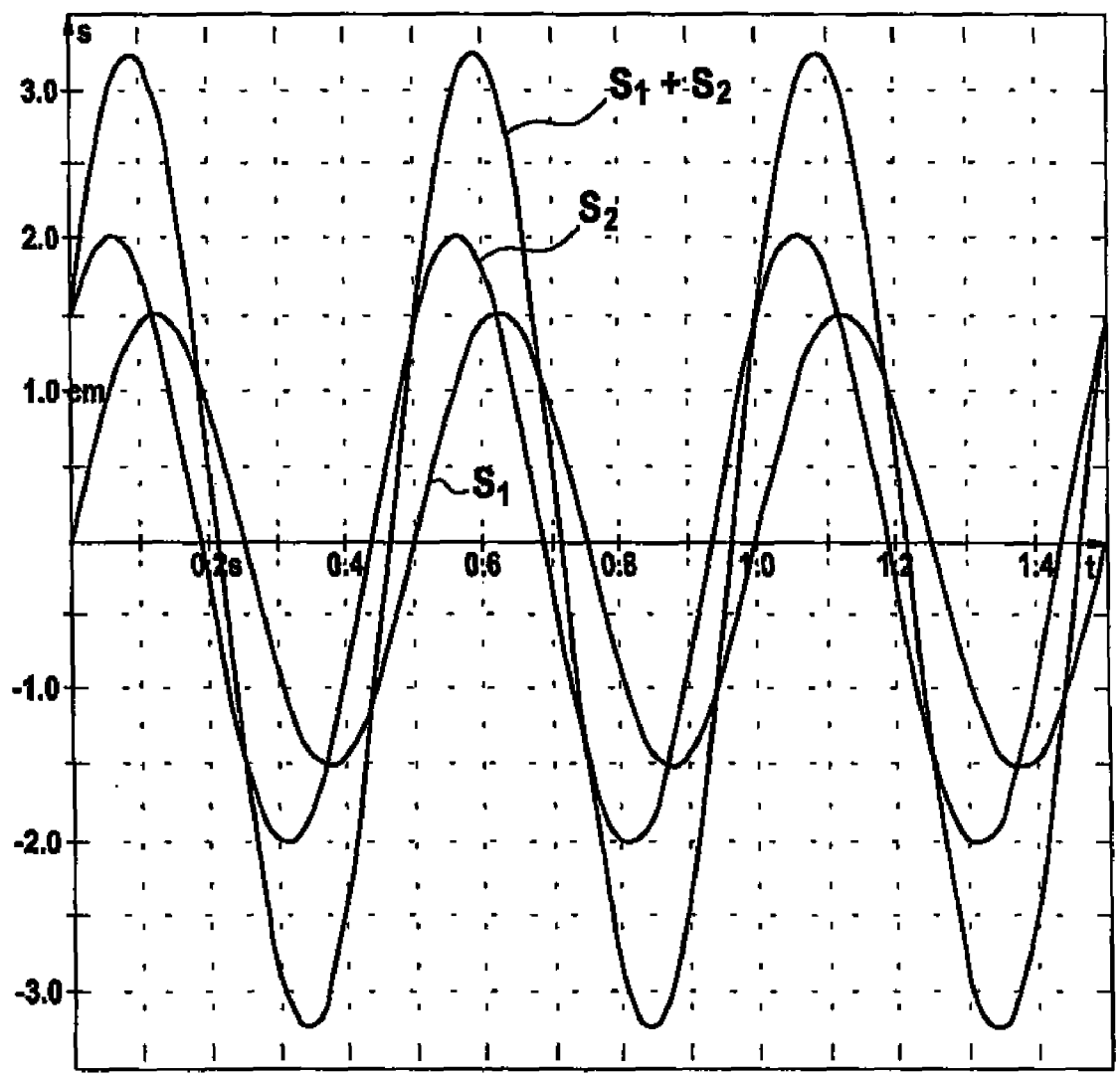
Figure 14:
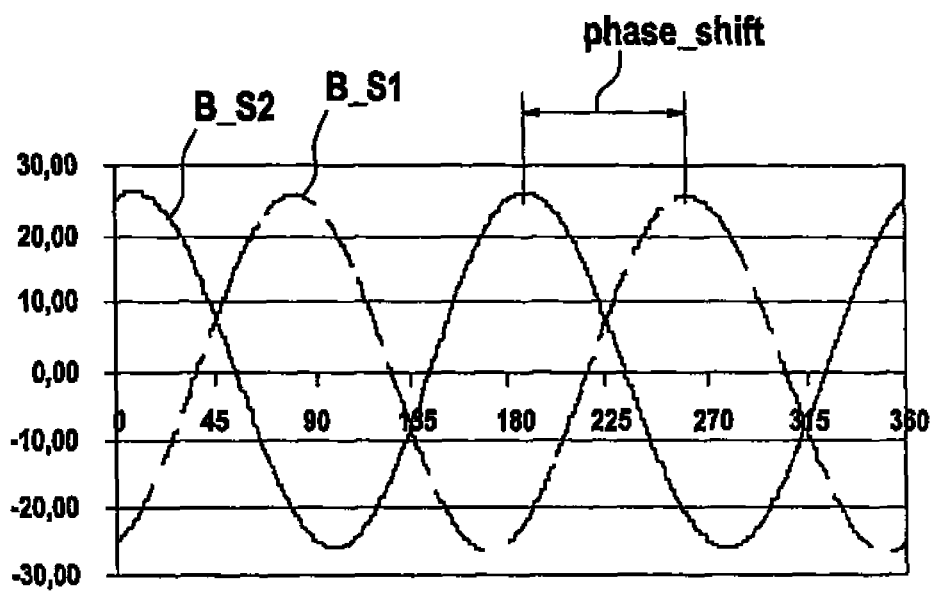
Figure 15:
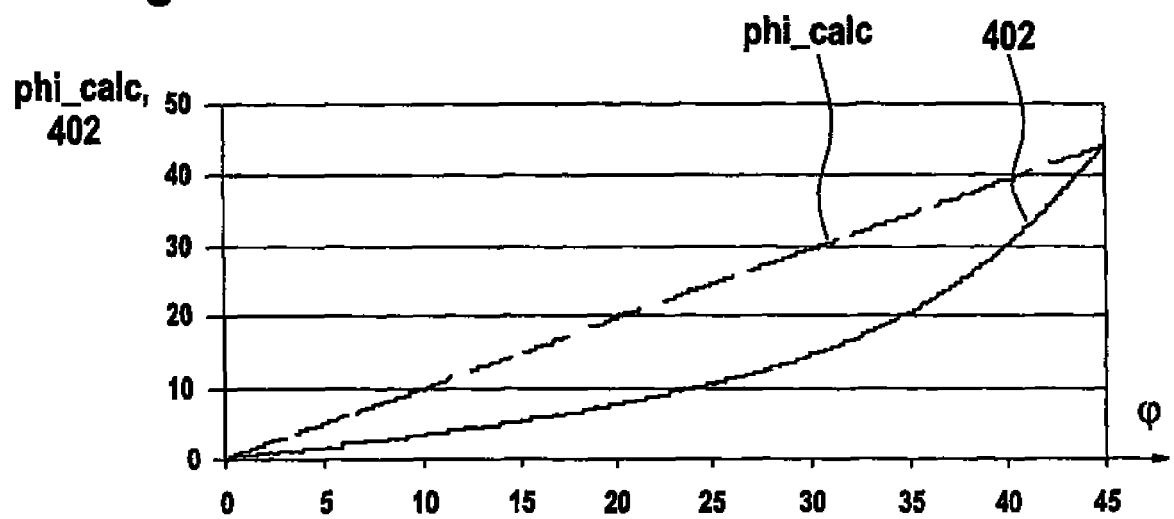
Figure 16:
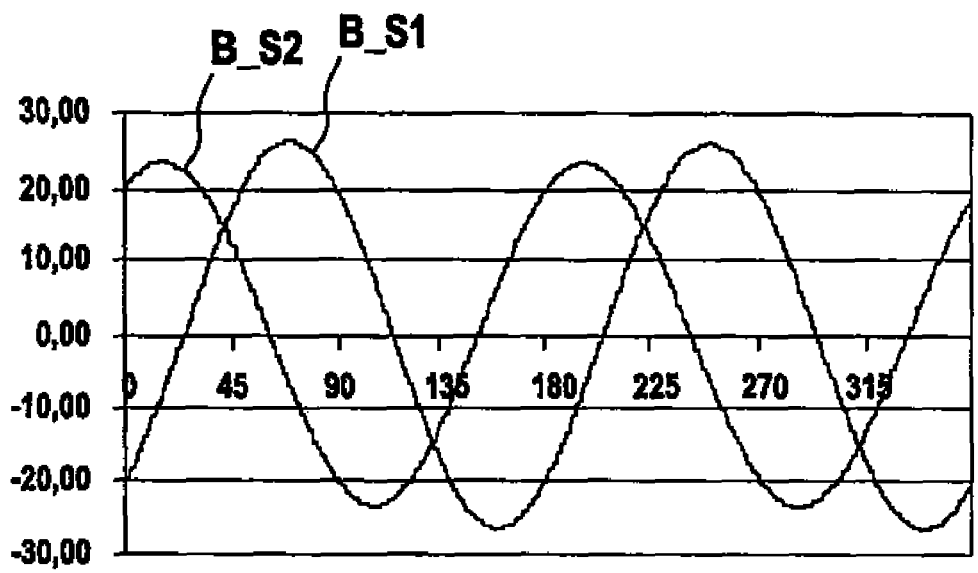
Figure 17:
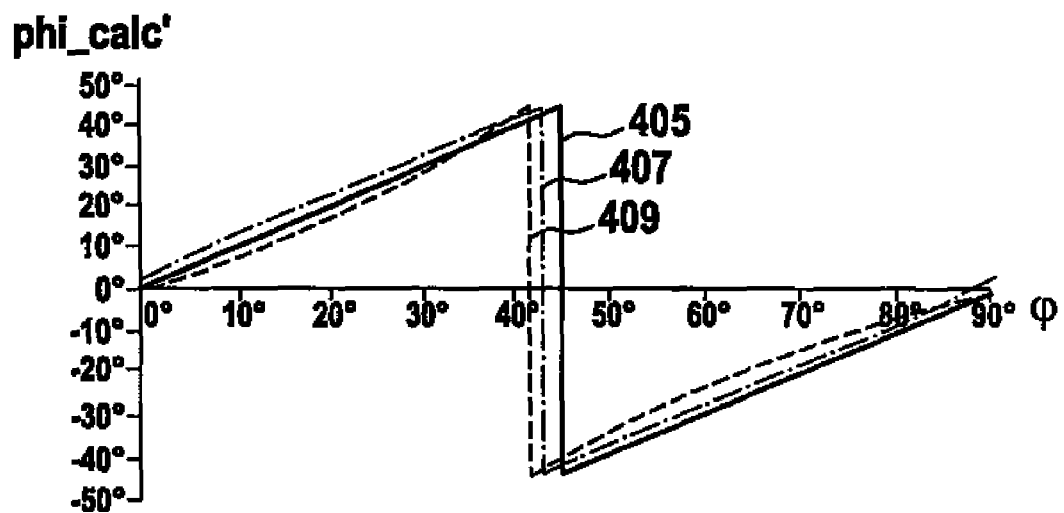

FIG. 13 schematically depicts a superposition of two sinusoidal signals;

FIG. 14 depicts the rotor position signals in the context of an arrangement according to FIG. 12;

FIG. 15 depicts the rotation angle calculated from the rotor position signals according to FIG. 14;

FIG. 16 shows a sensor arrangement having two rotor position sensors arranged asymmetrically in one plane; and FIG. 17 depicts the rotation angle calculated from the rotor position signals according to FIG. 16.

DETAILED DESCRIPTION

Figure 1:
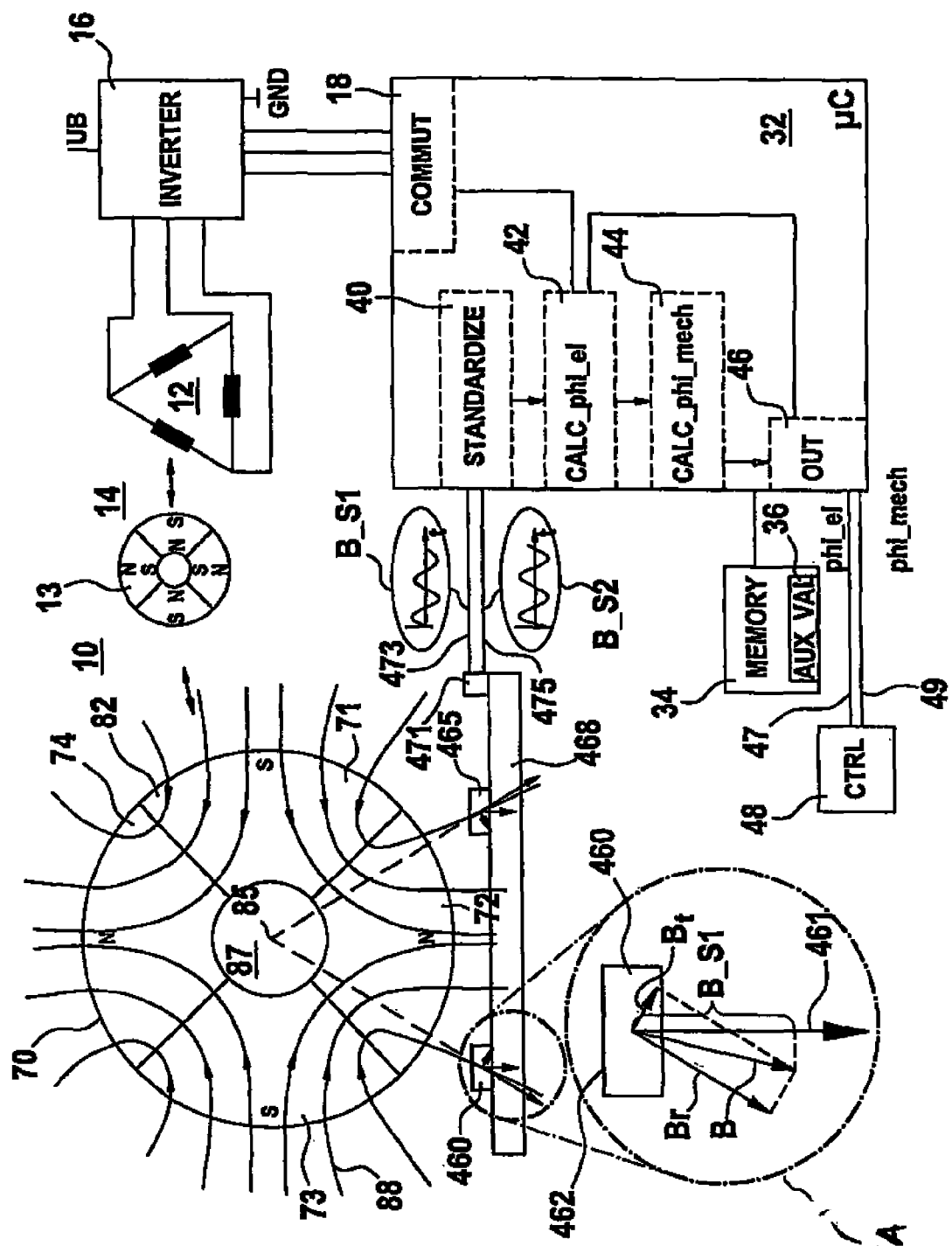
FIG. 1 shows an exemplifying embodiment of an absolute rotation angle sensor according to the present invention.

FIG. 1 shows an electric motor 10 having a stator 12 and a rotor 14 that interacts therewith, said rotor having a rotor magnet 13.

Rotor 14 is controlled by a power stage INVERTER 16 as a function of commutation signals of an apparatus COMMUT 18. Motor 10 can be connected to an operating voltage UB.

Electric motor 10 comprises a microcontroller (microprocessor) µC 32 and a MEMORY 34, associated with the latter, in which auxiliary values AUX_VAL 36 are stored. µC 32 comprises the modules STANDARDIZE 40, CALC_phi_el 42, and CALC_phi_mech 44, as well as an output module OUT 46 by way of which an absolute value phi_el for the electrical rotational position of rotor magnet 13 in the range [0° el. to 360° el.] and/or an absolute value phi_mech for the mechanical rotational position of rotor 14 in the range [0° mech.-360° mech.] can be outputted, for example via data lines 47 and 49.

A four-pole permanently magnetic sensor magnet 82 is arranged on a shaft 87 of rotor 14, said shaft's rotation axis being designated 85. Two analog rotor position sensors 460, 465 are arranged on a circuit board 468 in a common plane. Rotor position signals B_S1 and B_S2 measured by sensors 460, 465 are delivered, for example via a plug connector 471 and respective conductor pairs 473, 475, to µC 32 so that the latter can ascertain, from rotor position signals B_S1 and B_S2, the electrical rotation angle phi_el and/or the mechanical rotation angle phi_mech. In a preferred embodiment, µC 32 and power stage 16 are likewise arranged at least partly on circuit board 468, on which rotor position sensors 460, 465 are also arranged.

Operation

Sensor magnet 82 is annular with a substantially cylindrical surface 70, and it has four poles 71, 72, 73, 74. It generates, as a function of rotation angle phi (FIG. 12), a substantially sinusoidal magnetic field 88 and a substantially sinusoidal magnetic flux density B. The magnetization depicted for sensor magnet 82 is referred to as pole-oriented or pole-oriented lateral; the magnetization within a pole is not homogeneous but instead changes in terms of direction and intensity as a function of location, whereas in the case of a diametrically magnetized magnet, for example, the magnetization within a pole is homogeneous and always points in the same direction.

The enlarged depiction of analog sensor 460 shows the so-called sensitive area 462 in which measurement takes place. Sensor 460 senses only that component of the magnetic flux density vector B that points in a direction toward sensitive area 462, which direction corresponds to the direction of normal line 461 onto said sensitive area 462. Because sensor 460 is not arranged tangentially to sensor magnet 82 (since normal line 461 does not intersect rotation axis 85 of sensor magnet 82), the sensor, unlike in usual arrangements, senses not only radial component B_r of magnetic flux density B but also tangential component B_t of magnetic flux density B. The component of magnetic flux density B that points in the direction of normal line 461 is labeled B_S1, and this component is measured by analog sensor 460 (S1) in the form of an analog signal.

Figure 1A:
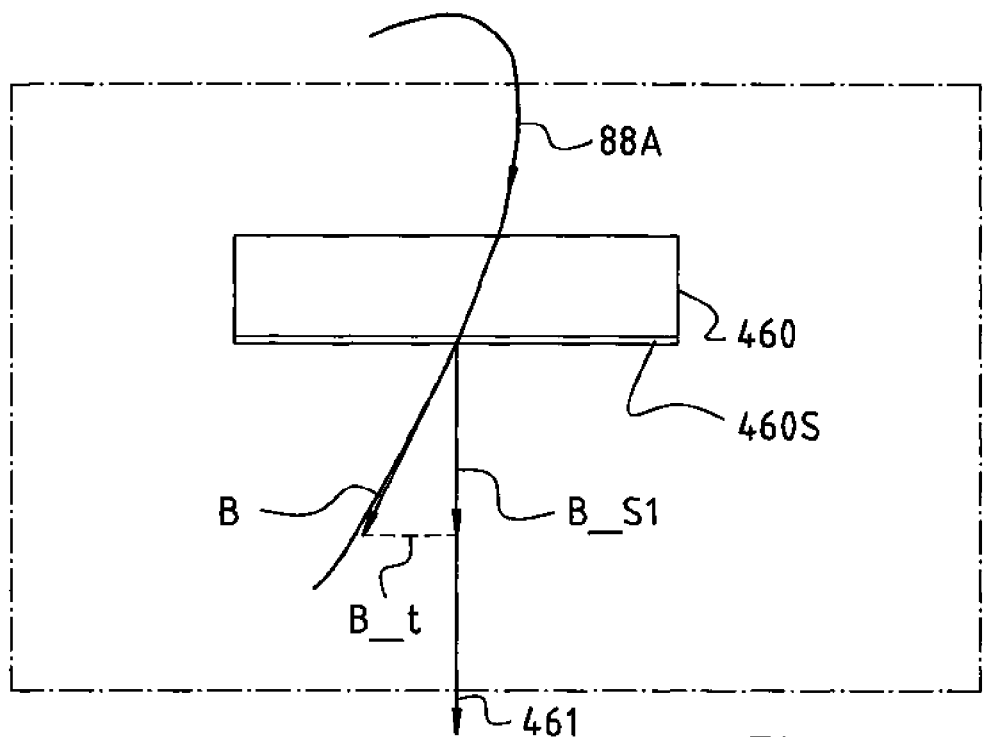
FIGS. 1A and 1B are enlarged depictions of detail IA of FIG. 1.

FIG. 1A is an enlarged depiction of portion 1A of FIG. 1. The reference characters are the same as in FIG. 1. The magnetic-field-sensitive sensor 460 has a magnetic-field-sensitive layer 460s (depicted only schematically) that can measure only magnetic fluxes B_S1 that extend perpendicular to layer 460s, i.e. in the direction of normal line 461 which extends perpendicular to layer 460s.

Figure 1B:
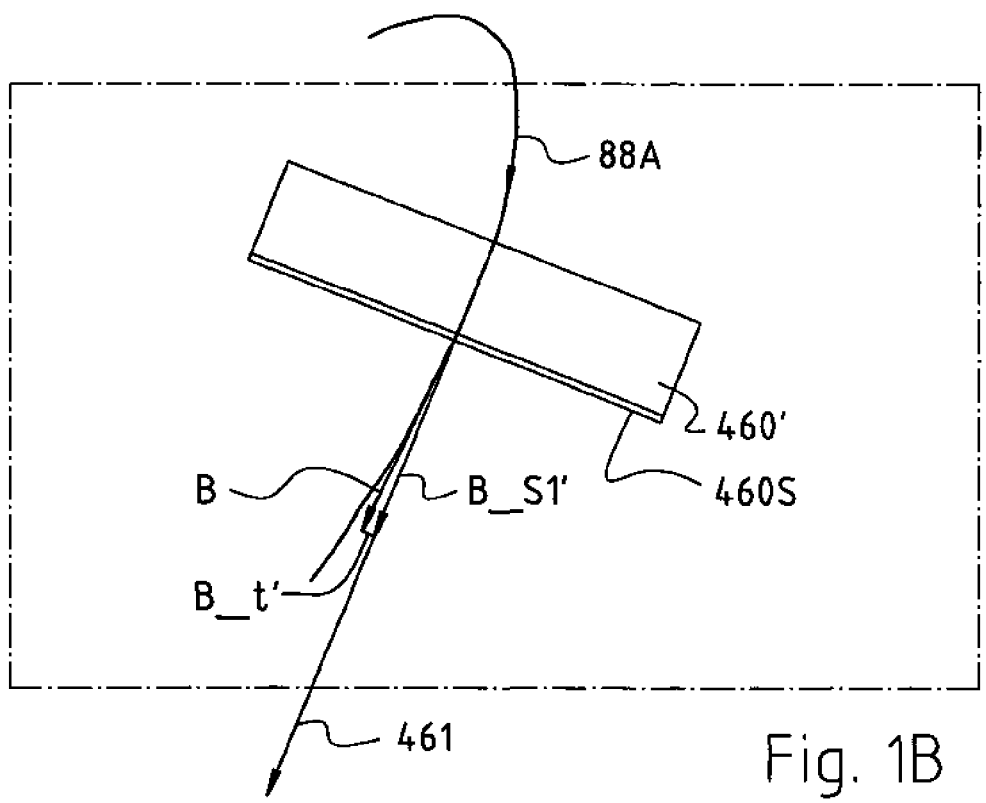

FIG. 1B is an analogous depiction, except that sensor 460' is depicted with a clockwise rotation of 20° as compared with FIG. 1A. Normal line 461 is once again drawn in. Magnetic flux 88A that is to be measured is the same in both cases, and has the same profile and the same magnetic flux density.

In FIG. 1A, what is measured by sensor 460 is a value B_S1 which corresponds to the vector component of the magnetic flux B that extends in the direction of normal line 461. A relatively large tangential component B_t is produced.

In FIG. 1B, magnetic flux 88A proceeds approximately perpendicular to magnetic-field-sensitive layer 460s, i.e. the magnitude of vector B differs very little from the measured value B_S1', and tangential component B_t' has a value of approximately zero.

A higher measured value B_S1' is therefore obtained in FIG. 1B than in FIG. 1A, in which a smaller value B_S1 is measured, even though magnetic field 88A is identical in both cases. This is a consequence of the fact that magnetic-field-sensitive sensors 460 of this kind can measure only the magnetic field vector component that occurs in the direction of their normal line 461, and components B_t and B_t' that extend parallel to layer 460s have only an indirect influence on the measurement result. Component B_t' is very small in FIG. 1B and consequently has almost no influence on the magnitude of B_S1', whereas in FIG. 1A, component B_t is larger and B_S1 consequently has a lower value there.

The enlarged depiction of rotor position sensor 460 shows the so-called sensitive area 462 in which measurement takes place. Rotor position sensor 460 detects only that component of the magnetic flux density vector B that points in the direction of normal line 461 onto sensitive area 462. Because rotor position sensor 460 is not arranged tangentially to sensor magnet 82, it detects (unlike in usual arrangements) not only radial component B_r of magnetic flux density B but also tangential component B_t of magnetic flux density B. The component of magnetic flux density B that points in the direction of normal line 461 is labeled B_S1, and this corresponds to the signal measured by rotor position sensor 460 (S1).

Even though rotor position sensors 460 and 465 are not arranged tangentially, sinusoidal signals B_S1 and B_S2 are also obtained with a sensor magnet 82 having a sinusoidal field profile; these signals exhibit a phase difference depending on the geometrical arrangement of rotor position sensors 460 and 465.

Rotor position signals B_S1 and B_S2 are delivered to µC 32, and a standardization of rotor position signals B_S1 and B_S2 is performed (if necessary) in a STANDARDIZE software module 40.

From the (standardized) rotor position signals B_S1 and B_S2, an absolute value phi_el for the electrical revolution of sensor magnet 82 and (since the latter is fixedly joined to rotor 14) of the rotor magnet is then calculated in the CALC_phi_el module 42. Because the sensor magnet does not possess more sensor poles (SP=4) than rotor magnet 14 has rotor poles (RP=4), a unique value phi_el can be assigned to each angle within one electrical revolution (360° el.=180° mech.) of rotor 14. The unique assignment of the values, and the corresponding values, are retained even after switching off and on, in the context of the accuracy of the arrangement. The non-volatile memory (e.g. ROM, EEPROM) is preferably accessed in module CALC_phi_el 42 for calculation of the value phi_el, and auxiliary values AUX_VAL are loaded from said memory for the calculation. The same applies to the CALC_phi_mech module 44.

For a configuration of the sensor magnet having SP=2 sensor poles, the angle phi_el in fact corresponds to an absolute value phi_mech for the mechanical revolution (360° mech.), and a unique value phi_mech can be assigned to each rotation angle of rotor 14 independently of the number RP of poles of rotor magnet 14.

For the sensor magnet 82 having four poles (SP=4), on the other hand, the value phi_el runs through the value range (0° to 360°) twice for each mechanical revolution of the rotor, so that directly after switching on it is not defined whether the motor is at the mechanical rotation angle x° mech. or in fact x°+180°. For this, the initial state would need to be known. For many applications, however, it is sufficient if, after startup, the electrical angle phi_el can be determined uniquely as an absolute value. The CALC_phi_mech module 44 ascertains a value phi_mech for the rotation angle. For sensor magnets having a number SP of sensor poles that is greater than the number RP of rotor poles, the rotation angle cannot be exactly indicated directly after the motor is switched on, either electrically with respect to the rotor or mechanically; instead, an initialization must first be performed in order to achieve a defined initial state. This is often not tolerable for safety-relevant applications.

With the electrical angle phi_el it is possible, for example, to carry out commutation of motor 10 in the COMMUT module 18, or the angle phi_el can be delivered to an external control unit CTRL 48 which then reacts accordingly.

Hall sensors or magnetoresistive (MR) sensors, such as AMR and GMR sensors, are preferably used as rotor position sensors. Such sensors can be referred to in general as magnetically scanning sensors.

Figure 2:
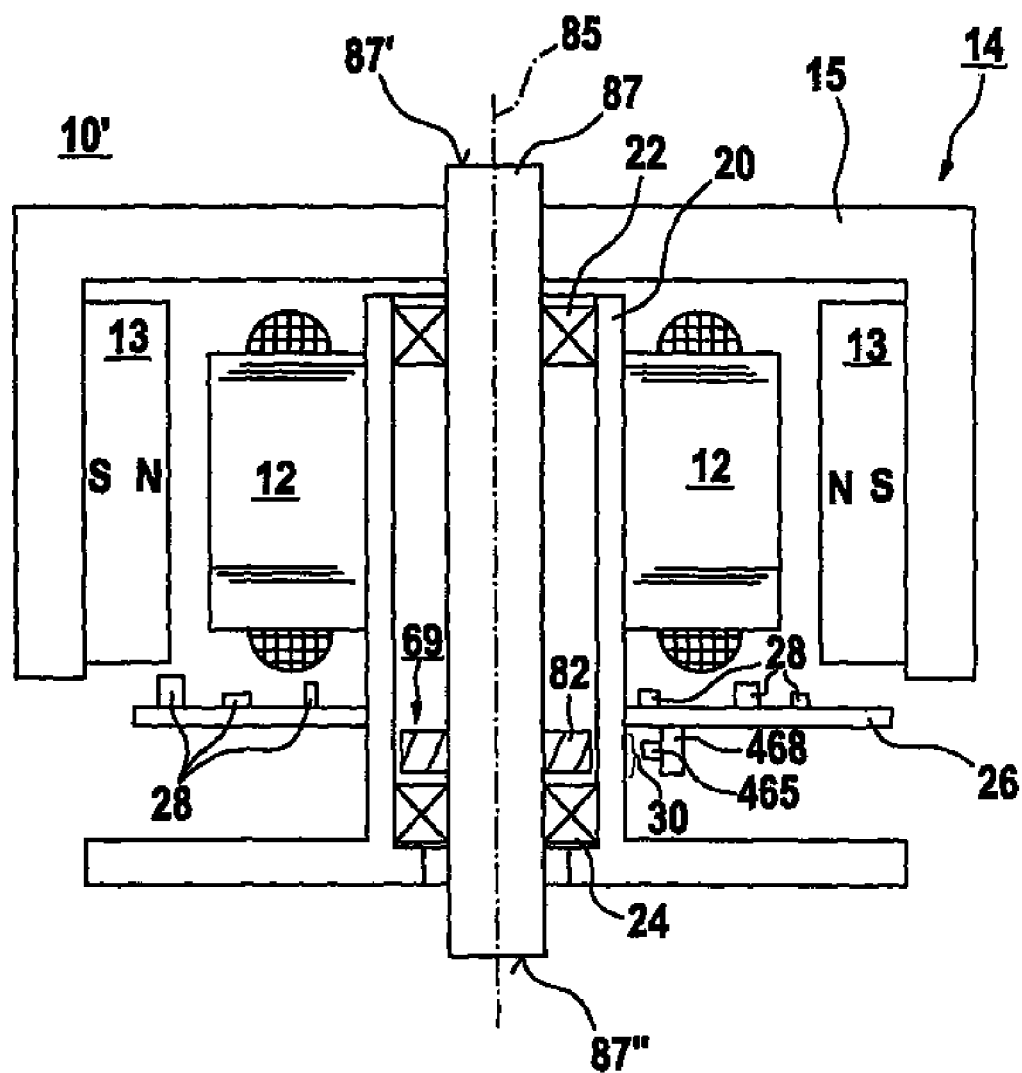
FIG. 2 is a longitudinal section through an exemplifying embodiment of an external-rotor motor according to the present invention.

FIG. 2 is a section through the shaft axis (rotation axis) 85 of a schematically depicted external rotor motor 10'. Motor 10' comprises a bearing tube 20 in which shaft 87' is journaled via two bearings 22 and 24. Stator 12 is mounted on the circumference of bearing tube 20. A rotor can 15 is mounted on shaft 87, and the permanently magnetic rotor magnet 13 is mounted in rotor can 15, so that said magnet lies opposite stator 12 and can interact therewith.

Also arranged on bearing tube 20 is a circuit board 26 having electrical and electronic components 28. Circuit board 468 of FIG. 1, having rotor position sensor 465 and rotor position sensor 460 (the latter not depicted), is mounted on circuit board 26, so that it extends parallel to shaft axis 85.

The schematically depicted sensor magnet ring 69, having sensor magnets 82, is arranged in rotationally secured fashion on shaft 87 in such a way that rotor position sensors 460 and 465 are located in the cylindrical circumferential region 30 of sensor magnet 82. Because sensor magnet ring 69 is located inside bearing tube 20 in this exemplifying embodiment, bearing tube 20 located between sensor magnet ring 69 and rotor position sensors 460, 465 is preferably made of a magnetically nonconductive material such as, for example, aluminum or plastic.

Shaft 87 is preferably made of a magnetically conductive material, for example a magnetically conductive steel, so that it can act as a magnetic yoke for sensor magnet 82. Also possible, however, is a shaft made of a magnetically nonconductive material such as, for example, plastic.

A special feature of this initialization-free absolute value system is that neither sensor magnet 82 nor rotor position sensors 460, 465 are arranged centrally on a shaft end or in the extension of shaft ends 87', 87", but instead both shaft ends 87', 87" are unoccupied and can be used. The term "decentralized absolute value system" could be used, and this makes new applications possible. Applications in which both shaft ends 87', 87" of the electric motor are used for drive purposes can, in particular, be equipped with an angle determination system according to the present invention.

For an internal rotor motor (not depicted) or a fan, sensor magnet ring 69 can be arranged on the shaft in the same fashion. The absolute value system is thus universally applicable.

Figure 3:
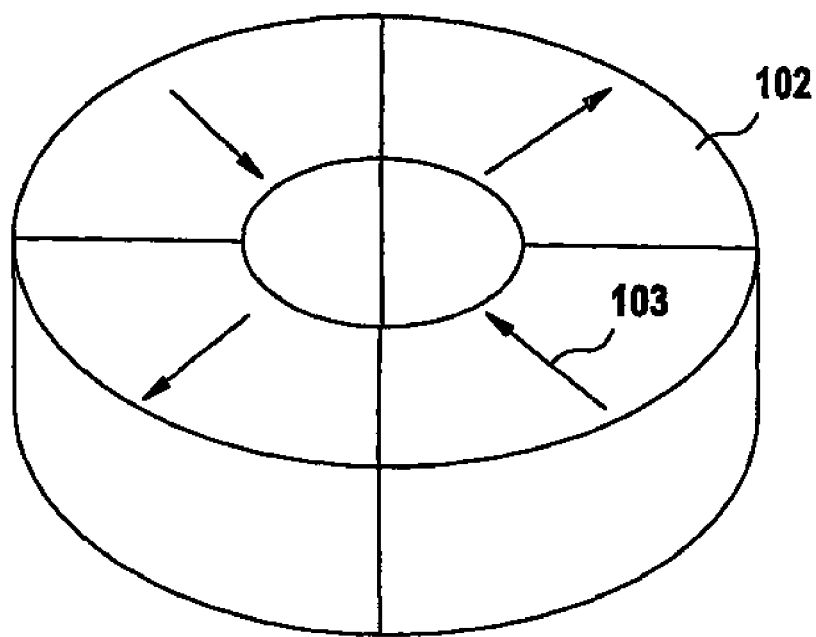
FIG. 3 shows a sensor magnet in which the poles are homogeneously magnetized, and the resulting magnetic flux density.
Figure 3:
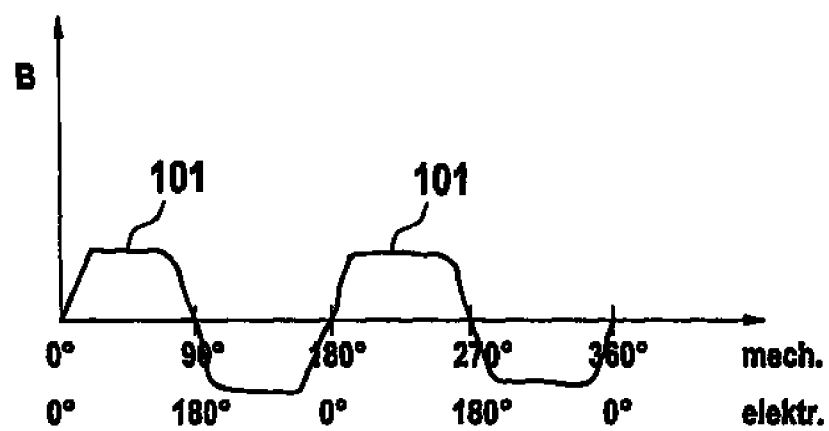

FIG. 3 shows a four-pole sensor magnet 102 in which the individual poles are magnetized homogeneously and in one direction. The magnetization is labeled 103. The resulting magnetic flux density B at the circumference is plotted below against the mechanical and electrical rotation angles, and the resulting profile of magnetic flux density B is trapezoidal. Evaluation at the center of the poles is difficult because of plateaus 101.

Figure 4:
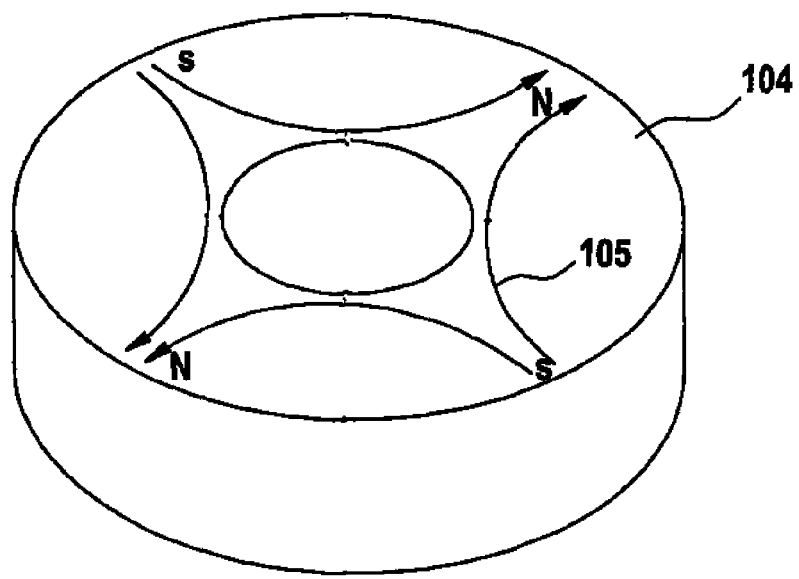
FIG. 4 shows a sensor magnet having a sinusoidal magnetization, and the resulting magnetic flux density.
Figure 4:
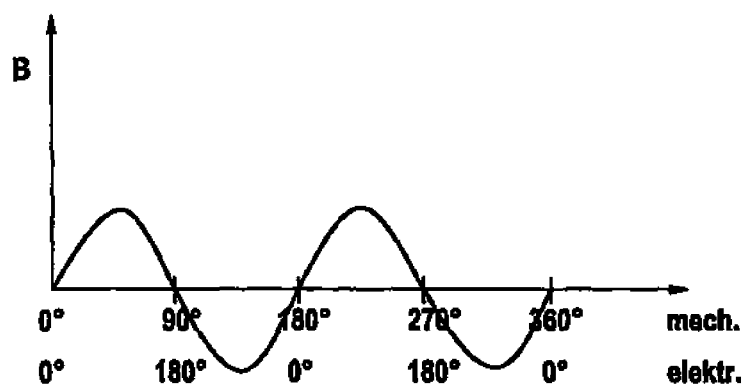

FIG. 4 shows a four-pole sensor magnet 104 having a magnetization that can be referred to as pole-oriented and lateral (as opposed to an axial magnetization, which is also possible). Magnetization 105 extends in an arc shape through the magnet. The magnetic flux density measured at the circumference is plotted analogously to FIG. 3. What results is a substantially sinusoidal magnetic flux density that is particularly well suited for evaluation.

Figure 5:
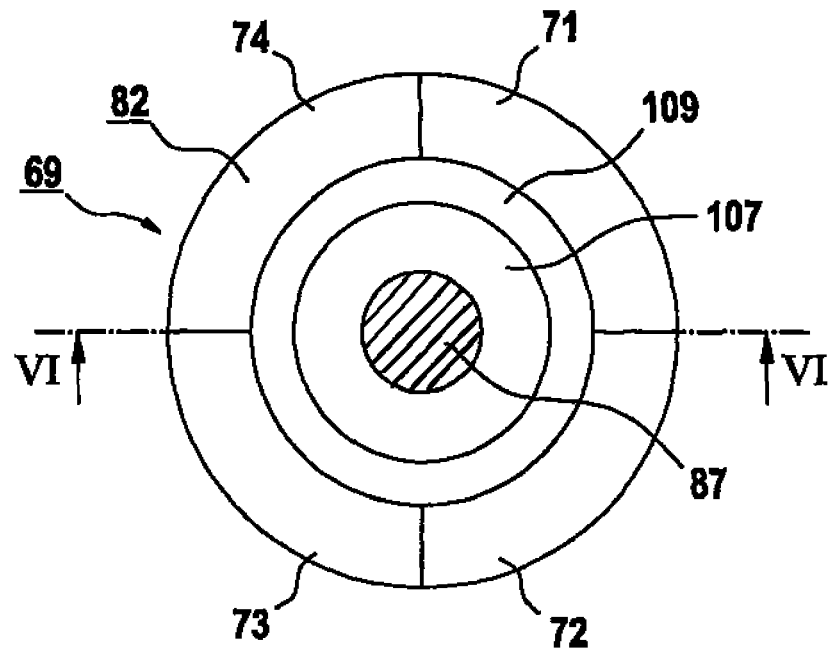
FIG. 5 is a plan view of a preferred embodiment of a sensor magnet ring.
Figure 6:
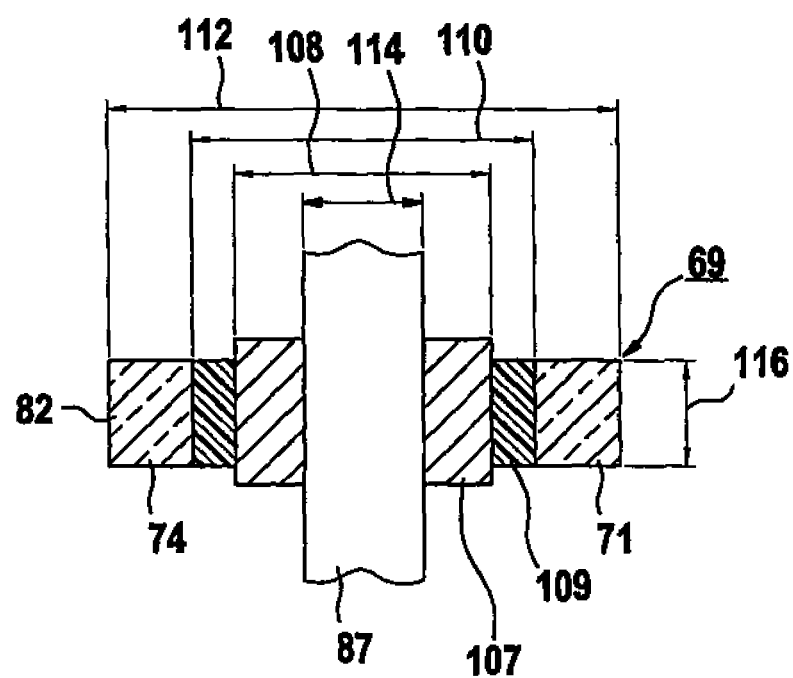
FIG. 6 is a section through the sensor magnet ring along line VI-VI of FIG. 5.

FIG. 5 is a plan view of sensor magnet ring 69, and FIG. 6 a section through sensor magnet ring 69, sensor magnet ring 69 being arranged on shaft 87. Sensor magnet ring 69 comprises sensor magnet 82 having the four sensor poles 71, 72, 73, and 74, and comprises a metal ring 107 and a plastic ring 109 that joins sensor poles 71 to 74 to metal ring 107.

Metal ring 107 sits on shaft 87 and is joined thereto in rotationally fixed fashion. Brass is preferably used for metal ring 107. Plastic 109 is introduced, for example, via an injection molding method between metal ring 107 and sensor magnet 82, in order to join them and at the same time to enable compensation for stresses resulting from thermal expansion, which stresses might otherwise cause sensor magnet 82 to burst.

The outside diameter of sensor magnet 82 is labeled 112 and is, for example, 37 mm. The outside diameter is preferably in the range of 15 mm to 50 mm, more preferably in the range of 20 to 40 mm.

The inside diameter of sensor magnet 82 or the outside diameter of plastic ring 109 is labeled 110. Length 110 is, for example, 27 mm.

The inside diameter of plastic ring 109 or the outside diameter of metal ring 107 is labeled 108. Length 108 is, for example, 20 mm.

The diameter of shaft 87 is labeled 114 and is, for example, 8 mm. Preferred values for diameter 114 of the shaft are in the range of 5 mm to 15 mm, although larger and smaller diameters are possible depending on the size of the motor.

The inside diameter of metal ring 107 is preferably selected so that a good join with shaft 87 is produced. The use of an inner metal ring 107 is advantageous because sensor magnet 82 can be produced in one or more standard sizes, and sensor magnet ring 69 can be adapted to shaft 87 by way of a modification (inexpensive in terms of manufacture) of inside diameter 114 of metal ring 107.

The width of magnet material 71 to 74 is labeled 116, and width 116 for one sensor magnet is, for example, 7 mm. The width for a sensor-only magnet, i.e. one that does not simultaneously serve as a rotor magnet, is preferably in the range of 3 mm to 20, more preferably in the range of 5 mm to 15 mm, and particularly preferably in the range of 6 mm to 12 mm.

The number SP of sensor poles is preferably SP=2, 4, 6, or 8, and particularly preferably SP=2 or 4.

In applications in which sensor magnet ring 69 is arranged in a corrosive environment, sensor magnet 82 can additionally be surrounded and covered by a (preferably magnetically nonconductive) corrosion-resistant material. It is possible, for example, to weld the sensor magnet into magnetically nonconductive stainless steel. Using a sensor magnet ring 69 of this kind it is possible, for example, to implement an immersion motor in which the shaft is surrounded by cooling fluid.

Figure 7:
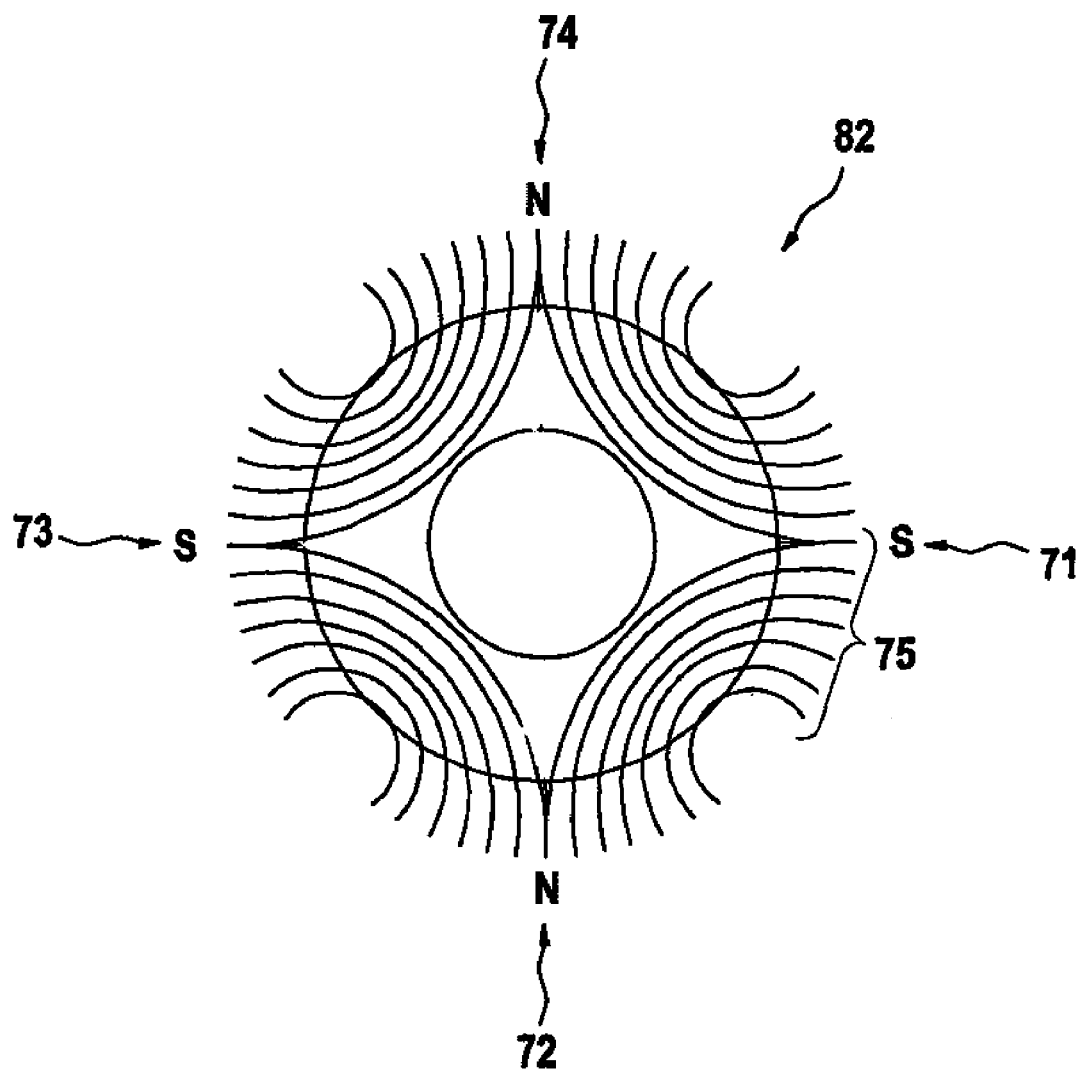
FIG. 7 depicts the profile of the magnetic field lines for a sensor magnet having a sinusoidal flux profile.

FIG. 7 is a detailed depiction of the magnetic field and the magnetic flux lines of the annular sensor magnet 82 of FIG. 1.

Sensor magnet 82 is embodied with four poles and comprises the two North poles 72, 74 (N) and two South poles 71, 73 (S). Sensor magnet 82 is sinusoidally magnetized, so that a substantially sinusoidal magnetic flux profile results at its outer circumference. The magnetic flux profile between the individual magnet poles 71, 72, 73, 74 that is determined by the magnetization is indicated by corresponding magnetic field lines 75.

Sensor magnet 82 preferably has a substantially cylindrical shape. A 13/22p hard ferrite compound per DIN 17 410 is suitable, for example, as a magnetic material.

Sensor Apparatus

Figure 8:
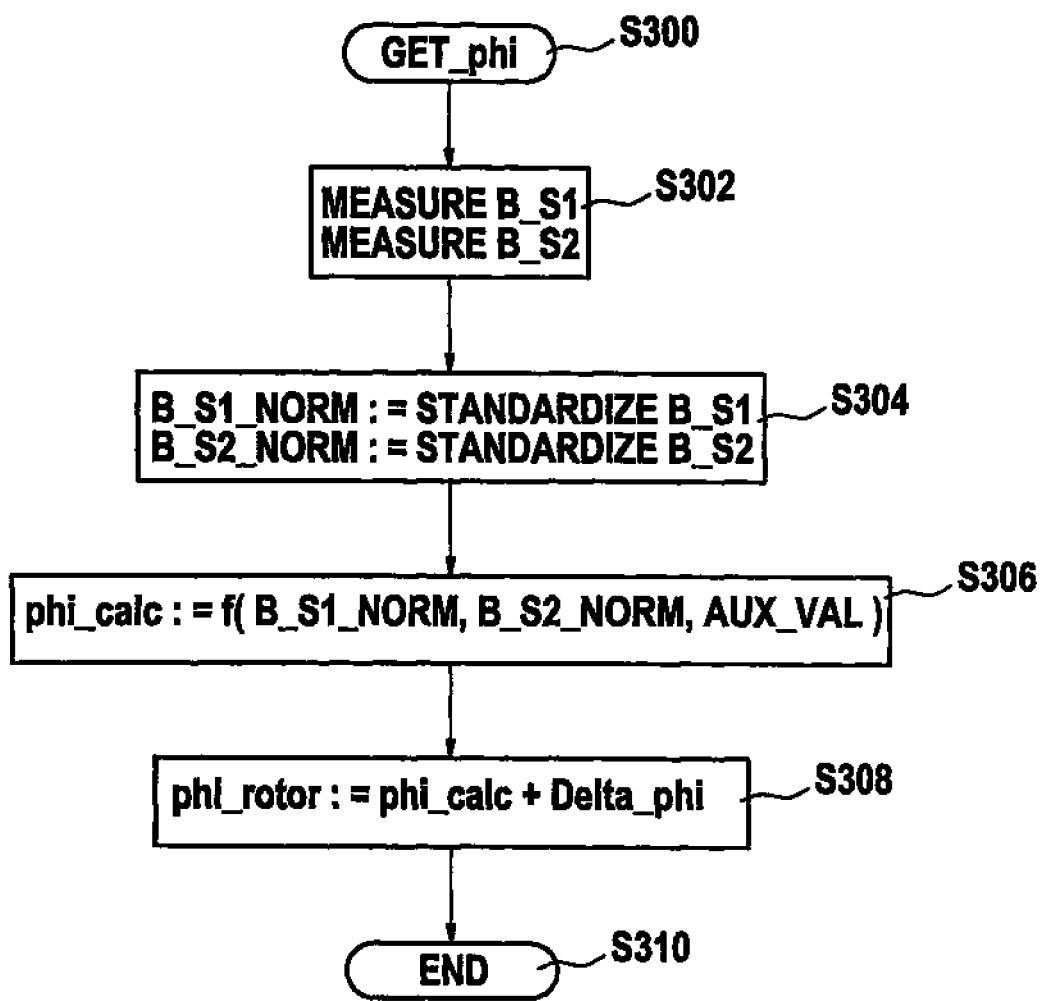
FIG. 8 is a flow chart for evaluating the sensor signals.

FIG. 8 is a flow chart of a routine GET_phi S300 for determining the rotation angle φ of the sensor magnet.

In step S302, the values B_S1 (SIG1) of the first analog rotor position sensor 84' and B_S2 (SIG2) of the second analog rotor position sensor 84" are ascertained (cf. FIG. 7).

In step S304, a standardization of the values B_S1 and B_S2 is carried out, and the standardized values are assigned to the variables B_S1_NORM and B_S2_NORM.

Standardization eliminates, for example, an offset that may be present, and the value is mapped onto the desired value range, e.g. onto the value ranges [0 to 255] or [−1.0 to 1.0]. Standardization can be performed in both analog fashion (e.g. in the rotor position sensor) and digitally (e.g. in the microprocessor). Standardization removes or diminishes a variety of influences on the measured values B_S1 and B_S2. Deviations result, for example, from mechanical eccentricities and production tolerances, from the superposition of other magnetic fields, from an attenuation of the sensor magnetic field and mechanical expansion of the rotor brought about by heat, and from signal decreases that occur at high rotation speeds due to frequency-dependent limitations on sensor properties.

In step S306 the rotation angle φ or phi_calc is then ascertained as a function of the values B_S1_NORM and B_S2_NORM and, if applicable, additional auxiliary values AUX_VAL. The rotation angle φ is ascertained either as an absolute value phi_el with reference to one electrical revolution (360° el.), i.e. rotation through the angle of one North and one South pole of the sensor magnet and/or rotor magnet, or else with reference to one mechanical revolution (360° mech.) of the rotor (360° mech.). Each rotor position within one electrical or mechanical revolution therefore has a unique rotation angle value associated with it.

Especially for rotors having a rotor magnet and an additional sensor magnet, it may be desirable, for example, to define a pole transition of the rotor magnet as 0°. The phi_calc value that is ascertained can therefore be further shifted by an amount equal to a correction value Delta_phi, so that the resulting variable phi_rotor exhibits a value of 0° at the point of the pole transition. In this application, the value range [0° to 360°] is usually used for angles. Other value ranges, such as [0 to 2π], can of course also be used, as is common knowledge to one skilled in the art.

In step 310, execution leaves the GET_phi routine.

Arrangement of the Rotor Position Sensors on a Circular Path

Figure 9:
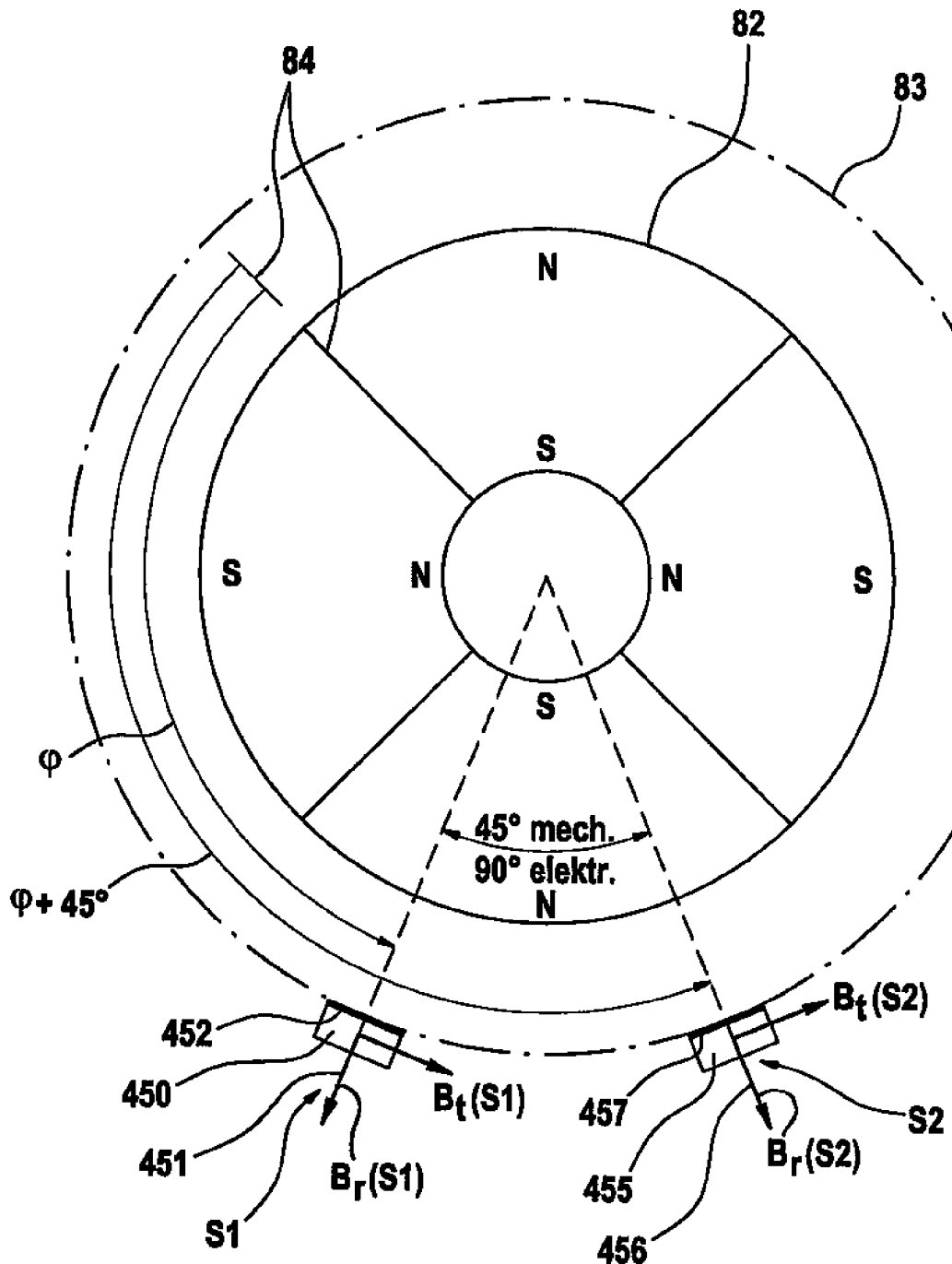
FIG. 9 shows a sensor arrangement having tangentially arranged rotor position sensors.

FIG. 9 shows a four-pole sensor magnet 82 and two rotor position sensors 450, 455 that are arranged tangentially on a concentric circular path 83 around sensor magnet 82 at an angular distance of 90° el. or 45° mech.

The basic calculations shown for this arrangement are also relevant to the further exemplifying embodiments and are presented here by way of example.

Sensitive areas 452, 457 of the rotor position sensors measure only that component of the magnetic flux density vector B that is perpendicular to the respective sensitive area 452, 457, and thus parallel to normal lines 451 and 456 of sensitive areas 452, 457, respectively.

The magnetic flux density vector B is made up of a radial component B_r and a tangential component B_t. What is obtained for a sinusoidal distribution of magnetic flux density B is $$B\_r = B\_r0 * \sin(2*\phi) \quad (1')$$

$$B\_t = B\_t0 * \cos(2*\phi) \quad (2')$$

or more generally $$B\_r = B\_r0 * \sin(\omega*\phi) \quad (1)$$

$$B\_t = B\_t0 * \cos(\omega*\phi) \quad (2)$$

where

φ=rotation angle of the sensor magnet with reference to the location (S1 or S2) of the rotor position sensor ω=number of pole pairs, i.e. in this case ω=2

B_r0=amplitude of the radial component of the magnetic flux density

B_t0=amplitude of the tangential component of the magnetic flux density.

Because rotor position sensors 450, 455 are arranged on circular path 83, only the radial component B_r of magnetic flux density B is measured, since that component coincides, in terms of direction, with normal lines 451, 456. The tangential component B_t, on the other hand, extends perpendicular to normal lines 451, 456 and is therefore ideally not measured. The mechanical rotation angle φ can be defined, for example, as the angle between rotor position sensor 450 and a pole change 84 of sensor magnet 82. For the rotation angle φ at sensor S1 450, therefore Φ=φ, and for the rotation angle Φ at sensor S2 455, which is at an angular distance of 90° el. or 45° mech., therefore Φ=φ+45° mech. Together with equation (1), therefore:

$$B\_S1 = B\_r(S1) = B\_r0 * \sin(2*\phi) \quad (3)$$

$$B\_S2 = B\_r(S2) = B\_r0 * \sin(2*(\phi+45°)) = B\_r0 * \cos(2*\phi) \quad (4)$$

Figure 10:
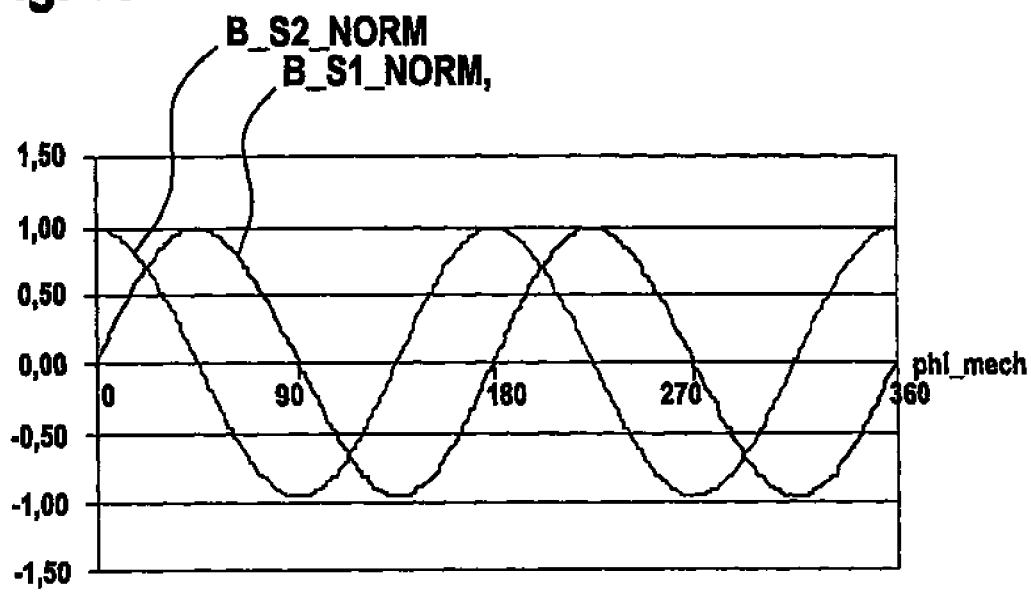
FIG. 10 depicts the rotor position signals in the context of an arrangement according to FIG. 9.

FIG. 10 shows the two signals B_S1_NORM and B_S2_NORM that are produced by standardization of the signals B_S1 and B_S2. Because the sensor magnet has four poles, signals B_S1_NORM and B_S2_NORM each have two full periods (720° el.) for one revolution of the rotor (360° mech.).

In this simple case, the rotation angle Φ can be calculated as follows. The following equation applies:

$$\text{phi\_calc'} := \arctan(B\_S1/B\_S2) \quad (5)$$

The arctan function yields values in the range [−90° to 90°], so that a unique assignment to the [0° to 360°] value range is not possible. A so-called quadrant differentiation must therefore be performed using the original signals B_S1_NORM and B_S2_NORM in order to obtain the absolute value phi_calc.

a) if B_S1_NORM≧0 and B_S2_NORM≧0, then phi_calc=phi_calc' b) if B_S1_NORM≧0 and B_S2_NORM<0, then phi_calc=180°+phi_calc' a) if B_S1_NORM<0 and B_S2_NORM<0, then phi_calc=180°+phi_calc' a) if B_S1_NORM<0 and B_S2_NORM≧0, then phi_calc=360°−phi_calc'.

Figure 11:
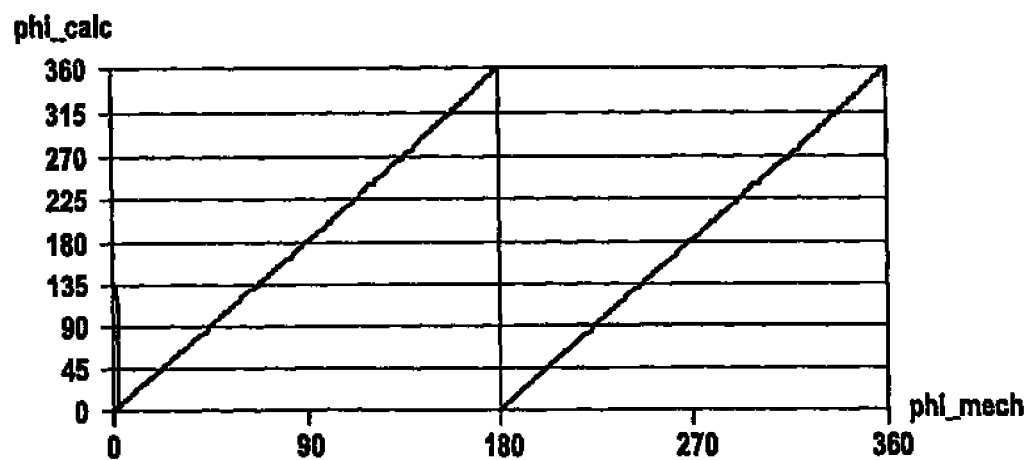
FIG. 11 depicts the rotation angle calculated from the rotor position signals according to FIG. 10.

FIG. 11 shows the resulting value phi_calc over one complete revolution of the rotor (360° mech.). For each mechanical revolution (360° mech.), the angle phi_calc passes twice through the value range [0° to 360°]. In order to obtain an absolute value in the range [0° to 360°] that is unique for one full revolution of the rotor, the angle phi_calc can, for example, be halved, and 180° is added to the value for each second half of the revolution.

Arrangement of the Rotor Position Sensors in One Plane

FIG. 12 shows a four-pole sensor magnet 82 and two rotor position sensors 460, 465, which here are arranged in one plane 469 that extends parallel to rotation axis 85 of sensor magnet 82.

Rotor position sensors 460, 465 each comprise a sensitive area 462, 467 that measures the component of magnetic flux density B in the direction of normal lines 461, 466. Magnetic flux density B(Φ) comprises, at location Φ=S1 of sensor S1

460, the radial component B_r(S1) and the tangential component B_t(S1), and magnetic flux density B(Φ) comprises, at location Φ=S2 of sensor S2 465, the radial component B_r(S2) and the tangential component B_t(S2). Because of the arrangement in a single plane, e.g. on circuit board 468, the sensitive areas of rotor position sensors 460, 465 are located in plane 469.

The arrangement of the rotor position sensors can be indicated, along with the tolerances that occur during manufacture, as follows:

tangential direction: A_S±Δt
radial direction: r_S±Δr, i.e. the distance of sensor magnet axis 85 from plane 469
axial direction: z±Δz.

The placement of rotor position sensors 460, 465 on circuit board 469 allows simple and inexpensive assembly. Circuit board 469 is preferably arranged on the side of rotor position sensors 460, 465 that is located opposite sensor magnet 82, in order to decrease the circuit board's influence on magnetic flux B.

Installing rotor position sensors 450 and 455 on a circular path 83 as shown in FIG. 9 is, in contrast, more complicated, and it requires, for example, the placement of rotor position sensors 450, 455 on inclined ramps that are mounted on a circuit board, on a curved shape, or on two bases, although in this case wiring is necessary.

Experiments have indicated that for an arrangement of rotor position sensors 460, 465 according to FIG. 12 in one plane, and with an angle Δ=α+β=45° mech. (90° el.) with respect to one another, rotor position signals B_S1 and B_S2 exhibit a phase shift that is no longer 90° but is instead, for example, 100°. This deviation derives from the fact that rotor position sensors 460, 465 are no longer located tangentially on a circular path, but instead are tilted with respect to it. As a result, rotor position sensors 460, 465 measure both a portion of radial component B_r of magnetic flux density B and a portion of tangential component B_t of magnetic flux density B.

Further experiments have indicated that with an angle Δ=α+β≈30° mech. between rotor position sensors 460 and 465 and with a four-pole sensor magnet 82, surprisingly, a phase difference of approximately 90° once again occurs in the resulting signals. By an appropriate selection of the angle Δ≠90° el. between rotor position sensors 460, 465, it is therefore possible, even when two rotor position sensors 460, 465 are arranged in the same plane 469, to obtain two rotor position signals B_S1 and B_S2 that are shifted by a phase difference of approximately 90°. This makes it easy to ascertain the absolute value φ for the rotation angle.

Mathematical Calculation for β=α

Signals B_S1 and B_S2 of rotor position sensors 460, 465 will now be ascertained by calculation. Rotation angle φ is defined as the angle between pole transition 84 and the center perpendicular 470 extending through axis 85 of sensor magnet 82. Angle α refers to the angle between center perpendicular 470 and rotor position sensor 465, and angle β to the angle between center perpendicular 470 and rotor position sensor 460. Using the statement Φ=φ+α for rotor position sensor 465, equations (1) and (2) yield, for the radial component B_r and tangential component B_t of the magnetic flux density:

$$B\_r = B\_r0 * \sin(\omega(\phi+\alpha)) \quad (1'')$$

$$B\_t = B\_t0 * \cos(\omega(\phi+\alpha)) \quad (2'')$$

For the magnetic flux density measured by sensor 460, this statement yields $$B\_S1 = B\_r * \cos(\alpha) - B\_t * \sin(\alpha) = B\_r0 * \sin(\omega(\phi+\alpha)) * \cos(\alpha) + B\_t0 * \cos(\omega(\phi+\alpha)) * \sin(\alpha) \quad (6)$$

Signal B_1 is therefore a superposition of two harmonic oscillations of the same angular frequency, and the applicable equations are $$B\_S1 = A * \sin(\omega*\phi + \gamma) \quad (7)$$

where $$A = ((B\_r0 * \cos(\alpha))^2 + (B\_t0 * \sin(\alpha))^2) \quad (8)$$

and $$\gamma = \arctan((B\_r0 * \sin(\omega\alpha) * \cos(\alpha) + B\_t0 * \cos(\omega\alpha) * \sin(\alpha)) / (B\_r0 * \cos(\omega\alpha) * \cos(\alpha) - B\_t0 * \sin(\omega\alpha) * \sin(\alpha))) \quad (9)$$

With a symmetrical arrangement of the two rotor position sensors 460, 465, β=α, and for signal B_S2, the result is obtained by replacing α with −α. The relevant equation is $$B\_S2 = A * \sin(\omega*\phi - \gamma) \quad (10)$$

Equations (9) and (10) yield for angle φ, in the context of symmetrically arranged rotor position sensors 460, 465:

$$\phi = 1/\omega * \arctan((B\_S1 + B\_S2)/(B\_S1 - B\_S2) * \tan(\gamma)) \quad (11)$$

where
ω=number of pole pairs of the sensor magnet
γ=correction angle according to equation (9).

Using equation (11), it is possible to calculate the angle φ in the context of a symmetrical arrangement of rotor position sensors 460, 465 (and therefore β=α) for any distance or angle of rotor position sensors 460, 465 with respect to one another. This therefore also allows an evaluation of rotor position signals B_S1 and B_S2 for cases in which there is not a phase difference of 90° between the signals.

Mathematically, this involves a superposition of two substantially sinusoidal signals B_S1 and B_S2 having the same prefactor (angular frequency) ω, but generally having different amplitudes and different phases. FIG. 13 shows, for illustrative purposes, two sinusoidal signals S1 and S2 plotted against time t. Superposition once again yields a sinusoidal signal S1+S2 from which the time t or rotation angle φ within one period can be ascertained uniquely. The respective exemplifying embodiments show how φ is ascertained for a specific arrangement of the rotor position sensors.

FIG. 14 shows signals B_S1 and B_S2 plotted over one complete revolution of the rotor. The rotor position sensors were arranged as follows:

r_S=22 mm
A_S=24 mm
α=β.

The amplitudes for the magnetic flux density at the locations of rotor position sensors 460 and 465 are B_r0=29.4 mT
B_t0=14.2 mT.

The resulting phase difference between signals B_S1 and B_S2 is in this case 143.96°. The phase difference phase_shift can be ascertained, for example, by determining the minimum angular difference phase_shift between two maxima of the two signals B_S1 and B_S2, where 360° corresponds to one period of the signals. The phase difference is thus in the range [0° to 180°].

FIG. 15 shows the angle, in the range [0° to 45°], calculated from signals B_S1 and B_S2. The dashed-line curve phi_calc was calculated using equation (11), and it corresponds fairly accurately to the rotation angle φ. Curve 402, on the other hand, was calculated without correction according to equation (11), and a definite error of up to 15.3° is evident. It is therefore apparent that a calculation of rotation angle phi_calc is possible despite a phase difference not equal to 90° between signals B_S1 and B_S2.

Mathematical Calculation for a Shift with Respect to the Center Perpendicular

With the arrangement of the rotor position sensors as shown in FIG. 12, it may happen, as a result of production tolerances, that angles α and β are not identical. This results in a tangential displacement Δt as compared with a symmetrical arrangement with respect to center perpendicular 470; this displacement is critical with this arrangement, since the distances of the rotor position sensors, and their angles with respect to the sensor magnet, change in different fashions. The other two tolerance directions—Δr for the distance r_S of the plane from the center of the sensor magnet, and Δz for the axial deviation—are less critical, provided the rotor position sensors are still located in the circumferential region of the sensor magnet in terms of the axial deviation. Only a deviation involving Δt will therefore be considered below.

Using the mathematical statements $$\alpha = \arctan((A\_S/2 + \Delta t)/r\_S) \qquad (12)$$

$$\beta = \arctan((A\_S/2 - \Delta t)/r\_S) \qquad (13)$$

the following is obtained for the angle φ:

$$\phi = 1/\omega * \arctan((B\_S2 * F1 - B\_S1 * F2)/(B\_S1 * F3 - B\_S2 * F4)) \qquad (14)$$

with the correction factors: $F1 = A1 * \sin(\gamma)$ (15)

$$F2 = A2 * \sin(\xi) \qquad (16)$$

$$F3 = A2 * \cos(\xi) \qquad (17)$$

$$F4 = A1 * \cos(\gamma) \qquad (18)$$

and the sensor signal amplitudes (resulting from the superposition calculation):

$$A1 = ((B\_r01 * \cos(\alpha))^2 + (B\_t01 \sin(\alpha))^2)^{1/2} \qquad (19)$$

$$A2 = ((B\_r02 * \cos(\beta))^2 + (B\_t02 \sin(\beta))^2)^{1/2} \qquad (20)$$

and the phase shift correction factors:

$$\gamma = \arctan((B\_r01 * \sin(\omega\alpha) * \cos(\alpha) + B\_t01 * \cos(\omega\alpha) * \sin(\alpha))/(B\_r01 * \cos(\omega\alpha) * \cos(\alpha) - B\_t01 * \sin(\omega\alpha) * \sin(\alpha))) \qquad (21)$$

$$\xi = \arctan((B\_r02 * \sin(\omega\beta) * \cos(\beta) + B\_t02 * \cos(\omega\alpha) * \sin(\beta))/(B\_r02 * \cos(\omega\beta) * \cos(\beta) - B\_t02 * \sin(\omega\alpha) * \sin(\beta))) \qquad (22)$$

where

B_r01=amplitude of the radial component of the magnetic flux density at sensor S1

B_t01=amplitude of the tangential component of the magnetic flux density at sensor S1

B_r02=amplitude of the radial component of the magnetic flux density at sensor S2

B_t01=amplitude of the tangential component of the magnetic flux density at sensor S2.

The calculation shows that the rotation angle φ can be ascertained from the sensor signals even with complex arrangements of the sensor magnets.

The necessary correction factors can be ascertained, for example, by determining the arrangement of the rotor position sensors and ascertaining the resulting magnetic flux densities at the sites of the rotor position sensors. Several magnet manufacturers offer computer software for this purpose, which indicates, for the particular type of magnet, the magnetic flux density at predetermined or user-selectable locations. The information provided is preferably already divided into the radial component B_r and tangential component B_t.

Alternatively, the rotor can be set in motion (preferably directly by the manufacturer), and the auxiliary values, in particular the phase difference of the rotor position signals, are calculated by analyzing the measured signals. The auxiliary values for calculating the rotation angle φ—i.e. in the previous exemplifying embodiment, especially the correction factors F1 to F4, the phase shift correction factors γ and ξ, and the amplitude correction factors A1 and A2—can be ascertained from the result. If such a determination is carried out via an initial measurement of the signals directly in the microprocessor of the electric motor, this requires a microprocessor having more performance than is needed merely to calculate the rotation angle φ. The initial measurement can also be analyzed externally in a special analysis apparatus.

FIG. 16 shows signals B_S1 and B_S2 plotted over one complete revolution of the rotor. The rotor position sensors were arranged as follows:

r_S=17 mm

A_S±Δt=17 mm+0.7 mm

α≠β.

The amplitudes for the magnetic flux density at the locations of rotor position sensors 460 and 465 are B_r01=25.25 mT B_t01=12.4 mT B_r02=28.5 mT B_t02=13.8 mT.

In this case the resulting phase difference between signals B_S1 and B_S2 is 105.77°.

FIG. 17 shows the angle phi_calc' calculated from signals B_S1 and B_S2 of FIG. 16 in the range [0° to 90°], i.e. the result before quadrant calculation (cf. description of equation (5)).

Line 405 shows the result of the calculation according to equation (14) with the auxiliary values or factors F1 to F4. With this type of calculation, usually no signal standardization takes place beforehand. The result agrees fairly accurately with the rotation angle φ, i.e. there is neither a phase shift nor a deviation in certain angle ranges.

Line 407 shows the result of a calculation according to equation (11) with an auxiliary value or correction factor γ and a previous standardization of signals B_S1 and B_S2. The standardization once again yields a rotation angle value with no deviation in certain angle regions, as shown by the straight lines. At the same time, however, the calculation method has produced a phase shift of approx. 2°, as is evident from the change in signal 407 in the vicinity of 43° rather than 45°. A phase shift of this kind is, however, correctable by the addition of a correction factor, whose value in this case is 2°.

Lastly, line 409 shows a calculation without standardization and without further correction. This type of calculation yields both the largest phase shift and the largest deviation from the ideal straight line, as is apparent from the curvature of signal 409.

With a greater phase difference between signals B_S1 and B_S2, the difference between lines 405, 407, and 409 in FIG. 16 would be greater.

The exemplifying embodiments have shown that it is possible to generate an absolute value system with two substantially sinusoidal sensor signals whose phase position with respect to one another is arbitrarily defined. The resulting freedom in terms of placement of the rotor position sensor or sensors is particularly advantageous. The absolute value sensor apparatus that has been described is usable with all types of motors.

A sensor magnet in which the sinusoidal profile of the magnetic flux density corresponds perfectly to the sine function is almost impossible to implement in production. The accuracy required of the sensor apparatus depends on the application, and is defined by the customer. The accuracy depends, among other factors, on the number of poles and on the accuracy of the magnetic flux generated by sensor magnet 82. For very simple applications, accuracies of +/−5° mech. are usually required, so that for a four-pole sensor magnet 82 the magnetic flux can deviate by a maximum of +/−10° el. Magnet manufacturers can, however, also supply four-pole sensor magnets with a sinusoidal magnetic flux density that have a guaranteed maximum deviation of +/−2° el. The rotation angle can thus be determined with an accuracy of +/−1°$_i$. If the magnetic flux density generated by sensor magnet 82 exhibits an inherent deviation from the sinusoidal shape, that deviation can be corrected in μC 32.

Many variations are of course conceivable in the context of the present invention. For example, instead of μC 32 or in addition thereto, a digital signal processor (DSP) can be selected for processing of the rotor position signals B_S1 and B_S2 in order to enable larger and faster calculations.

What is claimed is:

1. An electric motor (19), comprising:
a rotor (14) arranged on a shaft (87) rotatable about an axis (85);
a stator (12), associated with said rotor;
an absolute-value rotational angle sensing arrangement, said sensing arrangement having a plurality of rotational angle sensors;
a sensor magnet (82), mounted on said rotatable shaft (87) for rotation about said axis (85) and having an even number SP of at least two sensor magnetic poles (71, 72, 73, 74), the sensor magnet (82) generating a rotation-angle-dependent magnetic flux (88) having a substantially sinusoidal profile; and
an evaluation apparatus (32) for generating an absolute value representing the instantaneous rotational position (phi) of said rotor (14) based upon output signals from two analog rotational angle sensors (460, 465), arranged at a predetermined spacing (As) with respect to each other, and each having a respective generally planar surface (462, 467) sensitive to said rotation-angle-dependent magnetic flux (88), which sensors are arranged on the stator (12) such that lines (461) normal to said magnetically sensitive surfaces (462, 467) do not intersect said rotation axis (85) of said sensor magnet (82); said analog sensors being configured to sense, at the location of the respective sensor (460, 465), a respective vector component of the locally effective magnetic flux, which components extend along said normal lines (461) in order to generate at each sensor, during operation, a respective rotor position signal (B_S1, B_S2) that characterizes the magnitude and sign of the sensed vector component, said analog sensors (460, 465) being arranged on a common circuit board (468) at said predetermined spacing (As) with respect to each other, said common circuit board (468) extending substantially parallel to said rotation axis (85) of the sensor magnet (82), said magnetically sensitive surfaces (462, 467) being arranged in a sensor plane (469) that extends substantially parallel to the rotation axis (85) of the sensor magnet (82) said rotor (14) . comprising a rotor magnet (13) having a number RP of rotor poles that interact with the stator (12), and wherein SP<=RP.

2. The electric motor according to claim 1, wherein the sensor magnet (82) has a pole-oriented magnetization pattern.

3. The electric motor according to claim 1, wherein the sensor magnet (82) has a lateral magnetization pattern.

4. The electric motor of claim 1, wherein the sensor magnet (82) forms part of a sensor magnet ring (69) which is mounted on said rotatable shaft (87) of said rotor (14).

5. The electric motor of claim 4, wherein said sensor magnet ring (69) further comprises an annular elastic element (109) between said shaft (87) and said sensor magnet (82).

6. The electric motor of claim 5, further comprising a metal ring (107) arranged between said elastic element (109) and said rotatable shaft (87).

7. The electric motor according to claim 1, wherein the analog sensors (460, 465) are arranged in said common plane (469) in such a way that the rotor position signals (B_S1, B_S2) exhibit a phase difference that is not equal to 90° ; and wherein
the evaluation apparatus (32) is configured to generate an absolute value (phi_el, phi_mech) from said rotor position signals.

8. The electric motor according to claim 1, wherein the analog sensors (450, 455, 460, 465) are arranged in such a way that the rotor position signals (B_S1, B_S2) generated by them during operation exhibit a phase difference of substantially 90°.

9. The electric motor according to claim 1, wherein the analog sensors (450, 455, 460, 465) are aligned in a common plane (469) extending in a direction that is substantially parallel to the rotational axis of the sensor magnet (82).

10. The electric motor according to claim 1, wherein the analog sensors (450, 455, 460, 465) each have an A/D converter associated with them, in order to output the sensed value as a digital value.

11. The electric motor according to claim 1, wherein the absolute value corresponding to each rotational position of the rotor is unique within one electrical revolution of the rotor magnet (13).

12. The electric motor according to claim 1, wherein the evaluation apparatus (32) has, associated with it, a nonvolatile memory (34) in which auxiliary values (AUX_VAL) for the evaluation apparatus (40, 42, 44), which depend on the arrangement of the rotor position sensors (450, 455, 460, 465), are stored.

13. The electric motor according to claim 12, wherein one of said auxiliary values (AUX_VAL), which is stored, enables a correction of the absolute value (phi_el, phi_mech) in such a way that the latter value has a predetermined value upon a pole change (84) of the rotor magnet.

14. A method of generating an absolute rotation angle value in an electric motor having a rotor (14) arranged on a shaft (87) rotatable about an axis (85);
a stator (12), associated with said rotor;
an absolute-value rotational angle sensing arrangement;
a sensor magnet (82), on said shaft (87), that has an even number SP of at least two sensor poles (71, 72, 73, 74), the sensor magnet (82) generating a rotation-angle-dependent magnetic flux (88) having a substantially sinusoidal profile; and an evaluation apparatus (32) for generating an absolute-value corresponding to the instantaneous rotational position of said rotor from output signals of two analog sensors (460, 465) arranged at a predetermined spacing from each other, each having a respective generally planar surface (462, 467) sensitive to said magnetic flux (88), arranged such that lines (461) normal to said sensitive surfaces do not intersect said rotation axis (85) of said sensor magnet (82);

said analog sensors (460, 465) being arranged on a common circuit board (468) at said predetermined spacing (As) with respect to each other, said common circuit board (468) extending substantially parallel to said rotation axis (85) of the sensor magnet (82), said magnetically sensitive surfaces (462, 467) being arranged in a sensor plane (469) that extends substantially parallel to the rotation axis (85) of the sensor magnet (82), said rotor (14) comprising a rotor magnet (13) having a number RP of rotor poles that interact with the stator (12) and wherein SP<=RP, which method comprises the steps of:

A) sensing, in said sensitive surfaces of the analog sensors (460, 465), respective vectorial components of the magnetic flux (88) along said lines (461) normal to said surfaces and thereby generating rotor position signals (B_S1, B_S2) which characterize the magnitude and sign of the sensed vector components;

B) delivering the rotor position signals (B_S1, B_S2) of two of said analog sensors (460, 465), to the evaluation apparatus (32); and C) generating, in the evaluation apparatus (32), an absolute value (phi_el, phi_mech) representing the instantaneous rotation angle of the rotor (14), as a function of the rotor position signals (B_S1, B_S2) of said two analog sensors (460, 465).

15. The method according to claim 14, wherein with the analog sensors (460, 465), rotor position signals (B_S1, B_S2) are generated which are dependent on the magnitude of a tangential component (B_t) of the magnetic flux density that acts on the relevant sensor.

16. The method according to claim 15, wherein with the rotor position sensors (460, 465), rotor position signals (B_S1, B_S2) are generated which are dependent on a superposition of the tangential component (B_t) and the radial component (B_r) of the magnetic flux density.

17. The method according to claim 14, further comprising generating, with the rotor position sensors (460, 465), rotor position signals (B_S1, B_S2) are generated whose phase difference (phase_diff) with respect to one another is in the range of 0° to 180° but excluding 87° to 93°.

18. The method according to claim 14, further comprising standardizing the rotor position signals (B_S1) before generating the absolute value (phi_el, phi_mech).

19. The method according to claim 14, further comprising storing, in a nonvolatile memory (34,) at least one auxiliary value (36) for the evaluation apparatus; and generating the absolute value (phi_el, phi_mech) as a function of the rotor position signals (B_S1, B_S2) and of the at least one auxiliary value.

20. The method according to claim 19, further comprising:

ascertaining and storing the at least one auxiliary value upon manufacture of the electric motor.

21. A method of generating an absolute rotation angle value in an electric motor having a rotor (14) arranged on a shaft (87) rotatable about an axis (85);

a stator (12), associated with said rotor and having three driving winding phases;

an absolute-value rotational angle sensing arrangement for rotational-angle-dependent control of currents in said winding phases;

a sensor magnet (82), on said shaft (87), that has an even number of at least two sensor poles (71, 72, 73, 74), for generating a rotation-angle-dependent magnetic flux (88) having a substantially sinusoidal profile; and an evaluation apparatus (32) for generating an absolute-value corresponding to the instantaneous rotational position of said rotor from output signals of two analog sensors (460, 465) arranged at a predetermined angular spacing from each other, each having a respective generally planar surface (462, 467) sensitive to said magnetic flux (88), arranged such that lines (461) normal to said sensitive surfaces do not intersect said rotation axis (85) of said sensor magnet (82);

which method comprises the steps of:

sensing, in said sensitive surfaces of the analog sensors (460, 465), respective vectorial components of the magnetic flux (88) along said lines (461) normal to said surfaces and thereby generating rotor position signals (B_S1, B_S2) which characterize the magnitude and sign of the sensed vector components;

delivering the rotor position signals (B_S1, B_S2) of two of said analog sensors (460, 465), to the evaluation apparatus (32);

generating, in the evaluation apparatus (32), an absolute value (phi_el, phi_mech) representing the instantaneous rotation angle of the rotor (14), as a function of the rotor position signals (B_S1, B_S2) of said two analog sensors (460, 465);

storing, in a nonvolatile memory (34,) at least one auxiliary value (36) for the evaluation apparatus;

generating the absolute value (phi_el, phi_mech) as a function of the rotor position signals (B_S1, B_S2) and of the at least one auxiliary value; and ascertaining the at least one auxiliary value by measuring a zero transition of a voltage induced in one strand of the stator, in order to enable matching of the ascertained auxiliary value to the rotation of the specific rotor magnet that interacts with the stator.

\* \* \* \* \*